3,341,350
METHOD OF PREPARING A URANIUM ARTICLE FOR A PROTECTIVE COATING
Philip D. Anderson and Paul R. Coronado, Livermore, Calif., and Louis M. Berry, Albuquerque, N. Mex., assignors, by mesne assignments, to the United States of America as represented by the United States Atomic Energy Commission
No Drawing. Filed Sept. 30, 1964, Ser. No. 401,763
3 Claims. (Cl. 117—50)

The present invention relates generally to coatings on metallic uranium and to a method of treating exposed surfaces on uranium articles prior to the placement of an improved protective coating thereon.

Metallic uranium has many applications in nuclear reactors and other atomic energy fields and also in non-atomic energy applications, such as, for example, counterweight or ballast where space is at a premium. However, uranium is a troublesome metal since it is very reactive and capable of readily corroding in atmospheric oxygen, particularly in the presence of water vapor. Besides this corrosion problem, uranium also presents a health problem in that the surface of the uranium becomes rapidly contaminated with large quantities of loose, powdery uranium oxide. This oxide is toxic and capable of both radiation poisoning and heavy-metal poisoning.

The coating of uranium with protective metals enables it to be used in the above and other applications and overcome or substantially minimize the health and other problems previously associated with uranium. However, experience has shown that many of these previous coatings are not capable of providing adequate protection for the uranium or of being economically applied to uranium surfaces. Most of these previous coatings were found to be relatively non-adherent to the uranium metal, and in many instances the coatings process, including the pretreatment of the uranium, proved to be so complicated and expensive as to render the process impractical from a production standpoint. For example, a process utilizing a solution of stannous chloride and alcohol was found to be objectionable from a production standpoint in that dimensional control of the article being processed could not be accurately maintained. Also, the article had to be periodically removed from the solution to remove excess amounts of tin from the article surface such as to render quality control very difficult.

An object of the present invention is to provide a new and improved method of preparing exposed surfaces of uranium articles such that protective coatings may readily adhere thereto.

Another object of the invention is to treat exposed surfaces of uranium articles for subsequent reception of protective coatings by utilizing a method unique for its simplicity, cost, and adaptability to production procedures.

A further object of the invention is to provide an improved coating or plating of uranium.

A still further object of the invention is to provide a uranium article having a rugged and highly adherent protective coating, such as nickel.

Other and further objects of the invention will be obvious upon an understanding of the examples about to be described, or will be indicated in the appended claims, and various advantages not referred to herein will occur to one skilled in the art upon employment of the invention in practice.

The metallic uranium described herein may be any of the uranium species such as uranium-233, uranium-235 or, uranium-238 and be formed as an article of any desired configuration by casting, rolling, machining, pressing, etc.

The uranium metal ordinarily undergoes preparatory treatments prior to the application of the protective coating as to enable the latter to better adhere to the uranium. Uniform chemical reaction with a treating solution has been previously and more readily attained with uranium articles having relatively "clean" surfaces such as by machining, grinding, etc. and, as with other metals, requires that the uranium surfaces be free of hydrophobic films such as are left by machining lubricants and coolants, and finger prints. Either vapor degreasing the article with trichloroethylene or degreasing by immersing it in acetone has previously been found satisfactory; but, if the article is exceptionally dirty it may be desirable to first scrub it in a suitable detergent and rinse it before degreasing.

After degreasing, the article should be rinsed and immersed in a suitable pickling solution until it is clean. A satisfactory pickling solution may be an aqueous acid solution made up of 8 molar nitric acid (8M HNO$_3$) which may be prepared by using equal volumes of distilled or deionized water and concentrated HNO$_3$ preferably as saying 70%. This nitric acid solution or bath removes the oxide film usually found on uranium and does not attack the metal, while uniformly dissolving the oxide.

Upon completion of the degreasing and pickling steps above described, the uranium article is ready for a tin bath treatment which is a novel feature of the present invention. This treatment is carried on in a treating solution preferably made up of stannous chloride (SnCl$_2$), nitric acid, and water as will be brought out in greater detail below. The treating solution may uniformly etch or remove about 1.0 to about 1.5 mils of uranium to provide a microscopically rough surface having peak-to-valley distances of about 0.4 of a mil so as to provide a suitable surface for adherence with a protective coating. During this treatment, a black film, believed to be uranium hydride which contributed heavily to inferior protective coatings on uranium articles as previously known since it minimized the adherence of the plating to the uranium, is prevented from forming on the uranium surface. The absence of this uranium hydride film is believed due to the compound of uranium with tin (USn$_3$) which is thermo-dynamically more stable than the uranium hydride (UH$_3$) such that the formation of the USn$_3$ film deters the formation of the hydride film. Possibly a thin film of about 100 angstroms of USn$_3$, remains on the surface of the uranium article to protect it from a final rinsing bath as will be described below and from the chemical action of an electroplating bath. It is believed that the predominant reactions in the SnCl$_2$-HNO$_3$ bath are according to the equations:

$$U + 2Sn^{++} \rightarrow U^{4+} + 2Sn \qquad (1)$$
$$U + 3Sn \rightarrow USn_3 \qquad (2)$$

Reactions 1 and 2 (reaction 2 is a supposition only) are believed capable of providing a uranium-tin intermetallic compound or alloy surface or film as well as a layer of metallic tin on the uranium that would be free of oxides and hydrides.

It is believed that a mechanism involving the oxidation or uranium to U$^{4+}$ by Sn$^{++}$ and the simultaneous reduction of Sn$^{++}$ to tin is the main process occurring in the SnCl$_2$-HNO$_3$ treating solution.

In order to stop the action of the treating solution and substantially remove reaction products such as metallic tin from the surface of the uranium articles, the latter are preferably subjected to a pickling solution composed of 8M HNO$_3$. If several uranium articles are to be treated and rinsed in this final pickling solution, it may be preferable to use a plurality of such solutions since a single solution may be contaminated by tin and chloride ions as to convert the solution into a mild treating solution of deleterious composition. For example, four containers of the 8M HNO$_3$ solution may be used to provide the final pickling which may be attained by progressively moving the treated uranium article through the solutions. To prevent the noted contamination of the pickling solution, the solution first subjected to a freshly treated uranium article may be discarded after a single use such that the second solution becomes the first solution for the next uranium article and a new fresh solution becomes the fourth or final solution. Of course, if the final solution is of a significant quantity, it may be possible to rinse several articles in a single solution before discarding it.

As the uranium article is removed from the treating solution and placed in the first of the plurality of final nitric acid pickling solutions (the articles need not be rinsed between the treating and pickling steps) there is vigorous reaction believed to be in accordance with the equation:

$$3Sn + 2NO_3^- + 8H^+ \rightarrow 3Sn^{++} + 2NO + 4H_2O \quad (3)$$

This reaction would expose a uranium-tin alloy surface on the uranium article since the metallic tin has been chemically removed.

The final pickling solution may be washed from the uranium article by briefly rinsing the article in distilled or deionized water at ambient temperature. Normally, uranium would react with water to produce harmful corrosion products, but with uranium articles provided with the novel uranium-tin alloy surface it has been found that they may remain in the rinse water for more than one hour without reacting with the water.

Concentrated nitric acid should not be used as a pickling solution since the process would fail because of the formation of uranium hydride due to the concentration of the acid being strong enough to destroy the novel surface on the uranium created in the treating solution.

The formation of the uranium-tin alloy film on the uranium surface due to the $SnCl_2$-$HNO_3$ treatment gives a surface free of uranium hydrides and oxides thereby providing the uranium with a final surface which will readily receive a metal coating, with excellent adhesion.

The uranium articles prepared in the aqueous solutions of the type described may be provided with a protective coating of metal. While several metals or combinations of metals provide adequate coatings for uranium, it may be desirable to use electrodeposited nickel since it readily adheres to uranium treated in the $SnCl_2$-$HNO_3$ bath. Electroplating the uranium articles may be accomplished by utilizing any suitable process, preferably a process such as or equivalent to the "Perflow" nickel plating process of the Harshaw Chemical Co., Cleveland, Ohio.

The following examples are given to define and illustrate the present invention and are not intended to limit the solutions to the proportions, volumes, temperatures or conditions described therein. Obvious modifications of these examples will occur to those skilled in the art.

A uranium article one inch wide, three inches long, and one-eighth of an inch thick may be used for process exemplification purposes. Thus, the volumes of the $SnCl_2$-$HNO_3$ treating solution, the nitric acid pickle solution used prior to the treating solution, and the several nitric acid pickling solutions used subsequent to the treating solution may each be of about 1.5 liters. A 1.5 liter batch of treating solution will treat about 40 square inches of surface.

In order to properly retain the treating solution, a container of a material such as earthenware, glass, Teflon (tetrafluoroethylene) or other chemically inert and nonmetallic substance may be used.

EXAMPLE I

A batch of the $SnCl_2$-$HNO_3$ treating solution having preferred proportions may comprise about 25 weight percent of stannous chloride (anhydrous; technical grade acceptable), about 8 weight percent of nitric acid and about 67 weight percent water. These chemicals may be mixed by adding half of the acid to the water, dissolving the $SnCl_2$, and thereafter slowly adding the remaining acid. The temperature of the solution is preferably maintained at a temperature of about 87±2° C. during treating.

Hydrated stannous chloride ($SnCl_2 \cdot 2H_2O$) may be used in place of the anhydrous chloride providing the oxidation of stannous to stannic has not been excessive, which would result in a very opaque solution due to insoluble metastannic acid. This may cause the concentration of the stannous ion in the solution to be below an acceptable value. When using hydrated stannous chloride the solution may comprise about 30 weight percent hydrated stannous chloride, about 8 weight percent nitric acid and about 62 weight percent water.

The uranium article may be degreased and immersed in the initial pickling solution (preferably 8M $HNO_3$) for about three minutes, but longer immersion periods are not detrimental. The article should appear clear to the eye and should not show the slightest hint of an amber color representing an oxide film.

The clean uranium article is then immersed in the treating solution for about one to about one-and-a-half minutes with the longer immersion time being used with freshly prepared solution. The solution may be gently agitated such as by moving the article around in the solution. After treating, the article may be quickly inspected visually for unreacted areas which, if any, will be obvious. The unreacted areas may be treated by briefly reimmersing the article in the treating solution.

After treating the article in the $SnCl_2$-$HNO_3$ bath it may be successively rinsed in several nitric acid pickling solutions. There may be, for example, four containers of nitric acid (preferably 8M solution) for the rinse, which may require a total of about 15 minutes. This rinsing time may be broken down among the various solutions such that the article remains about 45 seconds in the first solution, about 4 minutes in the second solution, and about 5 minutes in each of the remaining solutions.

During cleaning and treating the uranium article should be exposed to air as briefly as possible, but after treating, the article may be stored in water or other suitable liquid for an hour or more prior to plating since rinsing in water is normally desirable to avoid contaminating the electroplating bath with $HNO_3$.

EXAMPLE II

In this procedure the pretreating pickling solution and the final pickling solutions may be of nitric acid assaying about 35% acid.

The treating solution may consist of about 17 weight percent hydrated stannous chloride ($SnCl_2 \cdot 2H_2O$), about 5 weight percent nitric acid, and about 78 weight percent water. The temperature of the treating solution may be about 75° C. The cleaning and treating of a uranium article in accordance with this procedure may be the same as for Example I, except that the article may remain in the treating solution for about two minutes.

In the process of the present invention the treating solution may consist of about 10 to about 30 weight percent stannous chloride added to about 87 to about 50 weight of water plus about 3 to about 20 weight percent of nitric acid. The temperature of this solution may be about 0° to about 100° C.

When using hydrated stannous chloride in place of anhydrous stannous chloride the treating solution may comprise about 12 to about 35 weight percent hydrated stannous chloride while the water comprises about 86 to about 50 weight percent. The temperature of the hydrated stannous chloride treating solution may be similar to that of the anhydrous stannous chloride solution. With the lower temperatures of either type treating solution it may be desirable to use longer immersion times.

The nitric acid pickling baths may assay about 20 to about 55 weight percent acid, but should not be too concentrated.

The immersion times in these final pickling baths should be of a sufficient duration as to remove excessive reaction products from the treated articles, which duration may be determined by the cessation of visible reaction. However, an excessive pickling period should be avoided since it will eventually destroy the uranium-tin alloy surface on the uranium article.

The uranium articles to be plated or electroplated by the "Perflow" or other process, such as the article having the above-mentioned dimensions, may be plated with about four mils of nickel or other metal or metals with the minimum thickness of the plating on any part of the article not being less than about two mils if good corrosion protection is to be assured.

Uranium articles prepared for nickel plating in accordance with the teachings of the present invention display remarkable adhesion between the plating and the uranium. For example, a plated uranium article may be tested by providing the article with an exposed interface such as by cutting off an end of the article with a water-cooled cut-off wheel or the like and thereafter subjecting the article to a water saturated atmosphere maintained at a temperature of about 200° to 205° F. for about 90 hours. After this exposure the interface may be probed with a scalpel-like tool in an effort to peel the plate from the uranium article as far along the article from the exposed interface as possible. Normally, this peeling extends only about one-sixteenth of an inch and, at most, less than three-sixteenths of an inch. Also, repeated attempts to remove or chip the plate from a uranium article by chiseling proved futile. Further attempts to remove the plating by only treating a portion of the sample so that peeling could be initiated also proved futile due to the plate breaking before the coating could be peeled.

While the treating solution preferably contains stannous chloride (anhydrous or hydrated), it has been found that stannic chloride ($SnCl_4$), nickel chloride ($NiCl_2 \cdot 6H_2O$), or chromium chloride may be substituted for the stannous chloride in the treating solution to provide satisfactory protective films or layers of an appropriate intermetallic compound on the surface of the uranium article. When using stannic chloride in place of the stannous chloride the weight percents of the stannic chloride with respect to the weight percents of the water and nitric acid may be substantially the same as those used with the stannous chloride. However, the temperature of the stannic chloride treating solution is preferably maintained at about room temperature. The nickel chloride treating solution may comprise about 23 weight percent nickel chloride, 15 weight percent nitric acid and 62 weight percent water. The solution may be heated to about 40° C. and the uranium article treated therein for a duration of about 2.5 minutes. In using the stannic chloride, nickel chloride, or chromium chloride treating solutions, the other aspects of the treating process may be the same as used with the stannous chloride treating solutions, i.e., the pretreatment and the final nitric acid pickling of the uranium article may be the same.

Also, while the present invention primarily relates to the treatment of uranium metal, other metals such as aluminum and the like may be satisfactorily treated in the described treating solution for providing better adhesion between the metal and subsequently applied coatings.

Nitric acid is the preferred acid in the tin bath since the etching effect with the other acids, such as, for example, hydrochloric acid in the treating solution is coarse and the results in the final plated product are not of the quality capable of being attained with $HNO_3$ in the treating solution.

While it is believed that an article subjected to the referred to treating solutions is provided with a protective compound on its surface, as hereinabove described, some evidence tends to indicate that another surface condition may be responsible for the surface protection. It has been found that the metal in each of the referred to treating solutions is electronegative with respect to the article, thus when the reaction between a cleaned article and any of the referred to treating solutions takes place to effect displacement of surface portions of the article, there may be a surface condition that is particularly receptive to the referred to plating material.

As various changes may be made in the solutions such as by varying the materials, weight percents of the various materials in the solutions, temperatures, immersion times, etc. without departing from the spirit and scope of the invention and without sacrificing any of its advantages, it is to be understood that all matter herein is to be interpreted as illustrative and not in a limiting sense.

We claim:

1. In the art of providing a uranium article with a protective coating on an exposed surface thereof wherein a treating solution is used to prepare said surface for receiving said coating: the method comprises immersing a portion of a uranium article in a treating solution consisting essentially of about 10 to about 35 weight percent of a stannous chloride selected from the group consisting of anhydrous stannous chloride and hydrated stannous chloride, about 3 to about 20 weight percent nitric acid, and about 87 to about 50 weight percent water, and maintaining said solution at a temperature of about 0° to about 100° C.

2. The method claimed in claim 5 with an additional step of pickling the uranium article in nitric acid assaying about 20 percent to about 55 percent acid after its immersion in the treating solution.

3. In the art of providing a uranium article with a protective coating on an exposed surface thereof wherein a treating solution is used to prepare said surface for receiving said coating: the method comprises immersing a substantially oxide-free and clean uranium article in a treating solution consisting essentially of about 25 weight percent anhydrous stannous chloride, about 8 weight percent nitric acid, and about 67 weight percent water, maintaining said solution at a temperature of about 87° C., and maintaining said article in the solution for about one to about one-and-a-half minutes.

References Cited

UNITED STATES PATENTS

| | | | |
|---|---|---|---|
| 2,265,467 | 12/1941 | Alexander et al. | 117—130 |
| 2,282,511 | 5/1942 | Bradley | 117—130 |
| 2,702,253 | 2/1955 | Bergström | 117—130 X |
| 2,854,738 | 6/1958 | Gray | 29—194 |
| 2,894,320 | 7/1959 | Gurinsky et al. | 29—198 |
| 2,894,884 | 7/1959 | Gray | 204—1.5 |
| 2,894,885 | 7/1959 | Gray | 204—1.5 |
| 2,935,425 | 5/1960 | Gutzeit et al. | 117—130 |
| 3,011,920 | 12/1961 | Shipley | 117—50 |
| 3,033,703 | 5/1962 | Schneble et al. | 117—47 |

ALFRED L. LEAVITT, *Primary Examiner.*

REUBEN EPSTEIN, *Examiner.*

C. K. WEIFFENBACH, *Assistant Examiner.*